Sept. 19, 1967 M. A. GREULICH 3,342,304
CONTAINER-TRANSPORT APPARATUS
Filed March 8, 1966 3 Sheets-Sheet 2
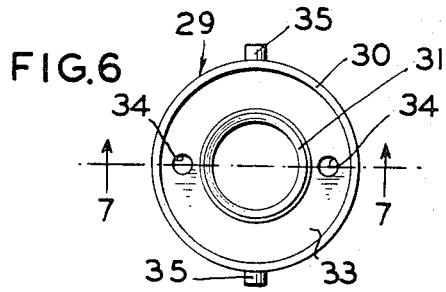
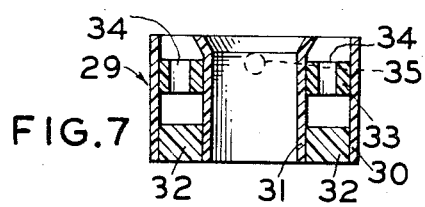
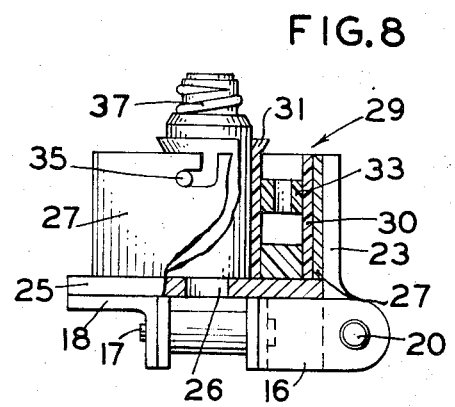
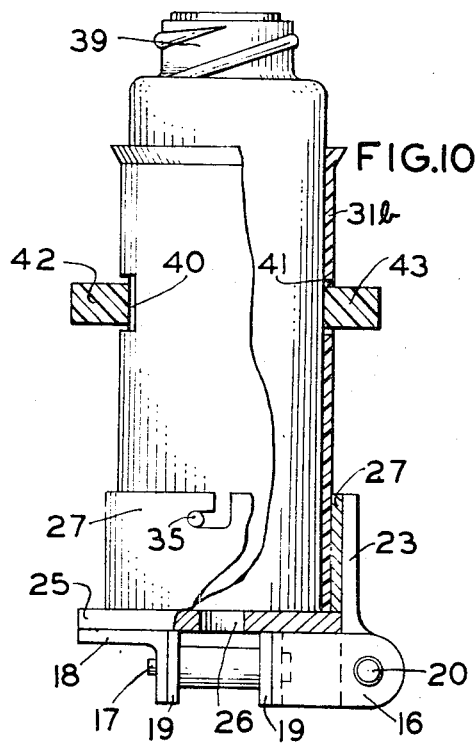
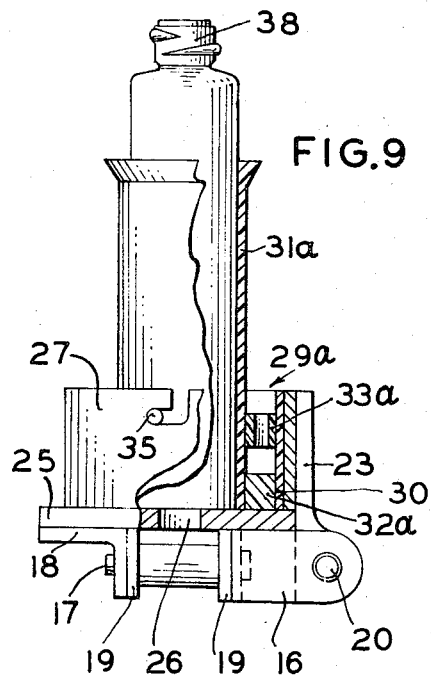
INVENTOR
MAX A. GREULICH
BY
*Rudolph J. Jurick*
ATTORNEY Sept. 19, 1967     M. A. GREULICH     3,342,304
CONTAINER-TRANSPORT APPARATUS
Filed March 8, 1966     3 Sheets-Sheet 3
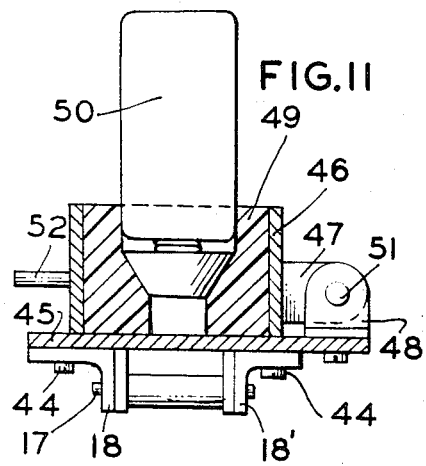
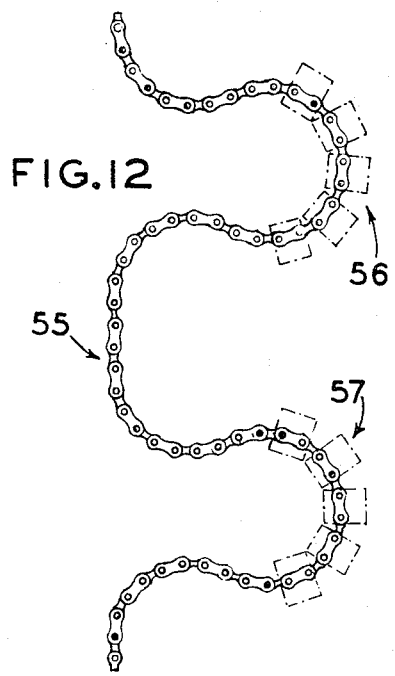
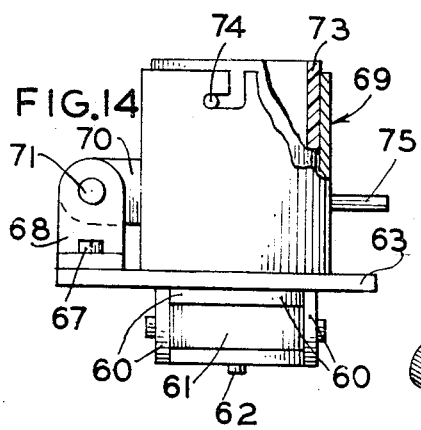
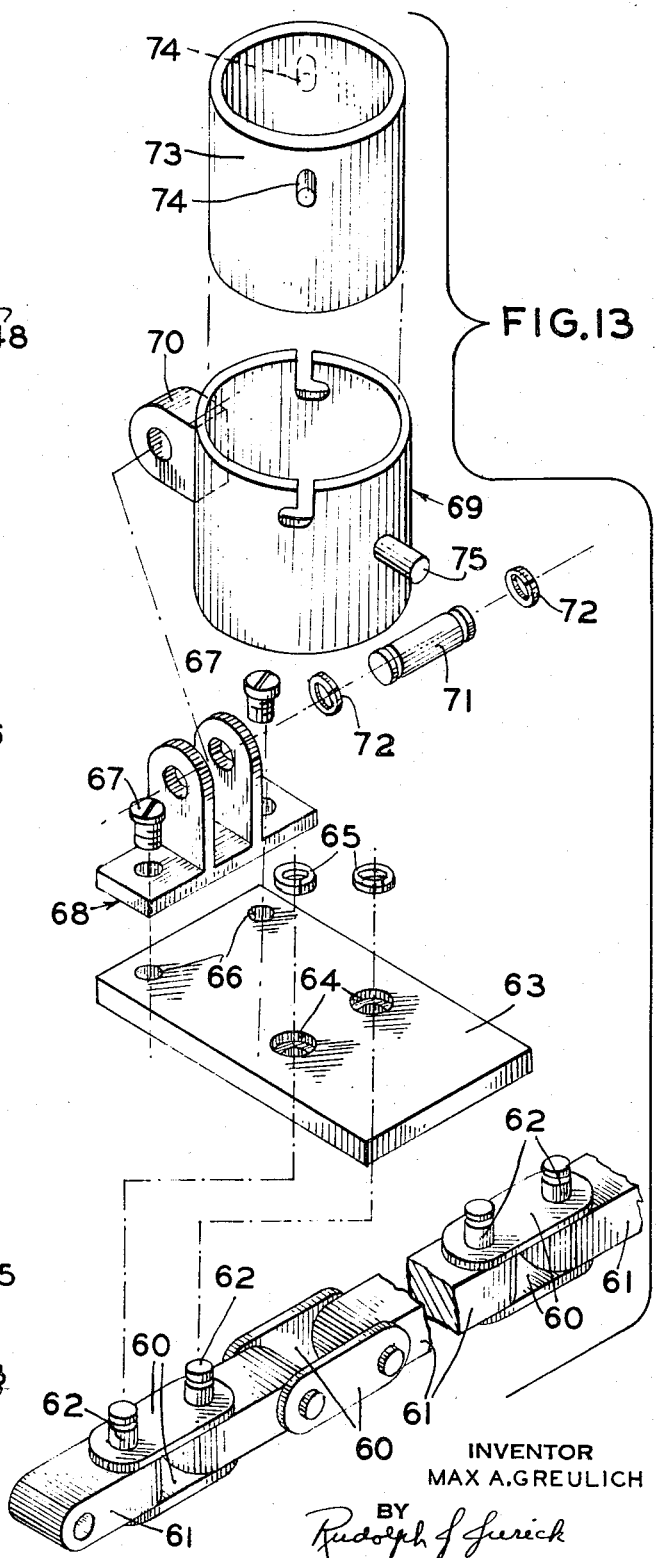
INVENTOR
MAX A. GREULICH
BY
Rudolph J. Jurick
ATTORNEY

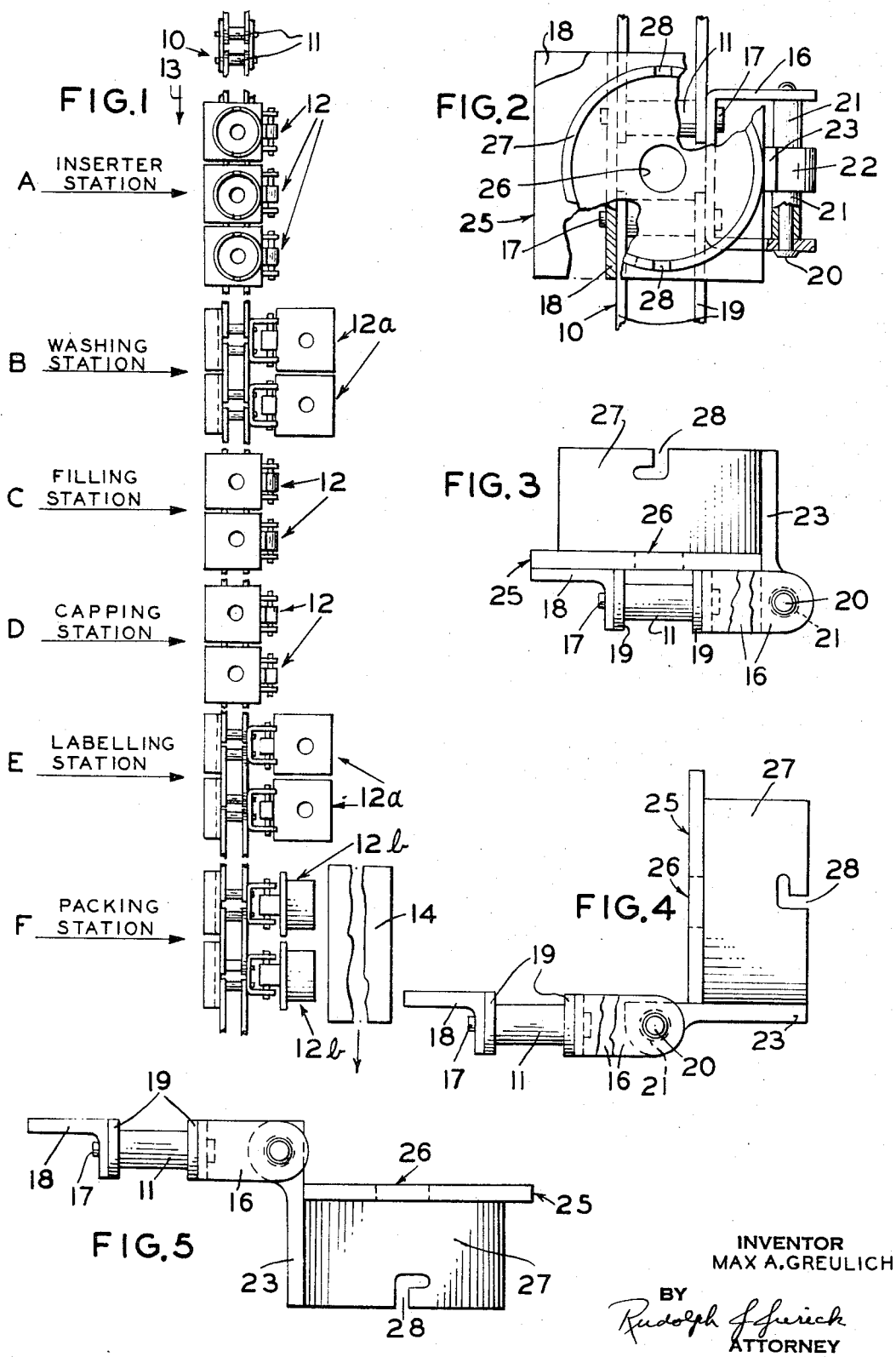

United States Patent Office 3,342,304
Patented Sept. 19, 1967

3,342,304
CONTAINER-TRANSPORT APPARATUS
Max A. Greulich, Montclair, N.J., assignor to
Wilhelm B. Bronander, Jr., Montclair, N.J.
Filed Mar. 8, 1966, Ser. No. 532,734
4 Claims. (Cl. 198—33)

ABSTRACT OF THE DISCLOSURE

A plurality of carriers are pivotally secured to a conveyor chain for rotation about an axis spaced from and parallel to that of the chain, which carriers have adapters removably secured thereto for receiving bottles or the like.

---

This invention relates to container handling apparatus and more particularly to an arrangement for transporting containers through various stations of a production line.

Apparatus made in accordance with this invention is adapted for use with bottles, jars, vials, tubes, or any odd or regular shaped vessel or container. In a production line, the containers are transported, in succession, through various machines for purposes of filling, capping, labeling, and packaging, etc. Present production lines incorporate a variety of machines made by different manufacturers and the containers are transported, from one machine to another, on a lugged conveyor with or without individual carriers for retaining the individual containers in proper spaced positions and orientation. Expensive control equipment is required to maintain the apparatus and the conveyor in predetermined, timed sequence. Also, present container-transport arrangements operate at a relatively low speed, are not easily adaptable for use with containers of various sizes and shapes, and do not permit automatic control of certain operations, such as inverted container cleaning, bottom labeling and transfer into cartons.

Container transport apparatus made in accordance with this invention comprises individual carriers secured to an endless conveyor chain, which carriers include easily replaceable adapters to receive containers of a given size and shape. The carriers are pivotally attached to the chain so that the transported container can be oriented, automatically, to lie in a predetermined plane, thereby to facilitate certain operations as the containers pass through the production line. Inasmuch as the containers are retained in their individual carriers throughout their entire run through the production line, the line may be operated at speeds substantially higher than is possible with prior apparatus of this type.

An object of this invention is the provision of transport apparatus provided with carriers for receiving a succession of containers, which carriers are pivotally-mounted to support the container in a desired position.

An object of this invention is the provision of transport apparatus comprising individual carriers pivotally secured to a conveyor chain, each carrier having an adapter removably secured thereto for receiving containers of a given size or shape.

An object of this invention is the provision of container-transport apparatus comprising a succession of pivotable carriers secured to an endless conveyor chain, each carrier being arranged to receive a removable adapter, or pocket, for securely retaining containers of a given size and shape in the upright, tilted or inverted position.

An object of this invention is the provision of container-transport apparatus comprising a succession of pivotable carriers secured to an endless conveyor chain, each carrier being provided with a removable adapter for securely retaining containers of a given size and shape, in a desired angular orientation relative to the chain, the arrangement being such that the containers can be transported in a straight or circular path in two planes, thereby to permit the incorporation of the apparatus with other production equipment such as fillers, cappers, etc.

These and other objects and advantages of the invention will become apparent from the following description when taken with the accompanying drawings. It will be understood, however, that the drawings are for purposes of illustration and are not to be construed as defining the scope or limits of the invention, reference being had for the latter purpose to the claims appended hereto.

In the drawings wherein like reference characters denote like parts in the several views:

FIGURE 1 is a top plan view showing a conveyor chain carrying hinged carriers made in accordance with one embodiment of this invention;

FIGURE 2 is an enlarged, top plan view, with portions broken away, showing a carrier in the normal, horizontal position;

FIGURE 3 is a side elevational view thereof;

FIGURE 4 is a corresponding side elevational view but showing the carrier rotated 90 degrees;

FIGURE 5 is a similar view but showing the carrier rotated 180 degrees;

FIGURE 6 is a top plan view of an adapter made in accordance with one embodiment of this invention;

FIGURE 7 is a cross-sectional view taken along the line 7—7 of FIGURE 6;

FIGURE 8 is a side elevational view, with portions broken away, showing the adapter secured to the carrier and a bottle inserted into the adapter;

FIGURES 9 and 10 are similar views showing adapters of modified construction for receiving bottles of different sizes;

FIGURE 11 is a transverse, cross-sectional view, generally similar to FIGURE 8, and showing modified constructions of the carrier and the adapter;

FIGURE 12 is a diagrammatic representation showing a portion of a production line wherein the conveyor chain follows circular paths in a horizontal plane;

FIGURE 13 is an exploded, isometric view showing a carrier of modified construction for attachment to a single conveyor chain adapted for movement in straight or circular paths in two planes; and FIGURE 14 is a side elevational view of the assembled carrier secured to the chain.

Reference now is made to FIGURE 1 wherein there is shown a portion of an endless conveyor chain 10 having spaced rollers 11. A plurality of individual carriers 12 (here shown as bottle carriers for purposes of illustration) are pivotally secured to the chain. The construction and arrangement of these carriers will be described hereinbelow. It is here pointed out that the carriers are positioned in side-by-side relation over the full length of the chain and that each carrier is mounted for individual rotation about an axis that is spaced from and parallel to that of the chain. Assuming that the chain moves in the direction of the arrow 13, the carriers pass through various operating stations, which stations may comprise separate machines. As the carriers pass through the bottle-inserter station A, they are positioned to receive empty bottles in the normal upright position from conventional bottle unscrambler and feeder apparatus. The carriers and the contained bottles may next pass through a washing station B wherein the bottles preferably are in the inverted position. For this purpose, the carriers 12a (and the contained bottles), are rotated 180 degrees, by suitable automatic means. Upon passing through the washing station, the carriers are rotated back to their initial positions, whereby the bottles can be filled at the filling station C and then capped, or otherwise closed, at the capping station D. By means of conventional apparatus, labels may then be applied to the bottles, either while the bottles are in the normal, upright position, or in the inverted position. In the latter case, the carriers are again automatically rotated 180 degrees, as shown by the carriers 12a in the labeling station E. At the end of the line, the carriers are rotated 90 degrees, as shown by the carriers 12b in the packing station F, thereby placing the bottles in horizontal position. The carriers have an opening formed in the bottom, whereby the bottles can be ejected out of the carriers by mechanical or solenoid-actuated plungers, as, for example, into a carton 14. Alternatively, the carriers are so constructed that the full bottom of the bottle is exposed for ejection purposes. The control of the bottle, during angular displacement thereof, is effected by means of adapters removably attached to the carriers.

It will be apparent that the bottle carriers are adapted to receive empty bottles at the beginning of the line, to transport the bottles, in succession, through various machines corresponding to the illustrated operating stations, and to properly orient the bottles as they pass through a particular operating station. The movement of the conveyor chain is timed, by conventional control means, to retain one or more bottles in a given operating station, depending upon the particular machine. For example, one or more bottles may be moved into the washing machine after which the conveyor chain is stopped for a period of time corresponding to the washing cycle. Alternatively, the conveyor chain may move continuously when the various machines are of the type which perform the particular operation while the bottles are in motion. In any event, the construction and arrangement of the bottle carriers is such that they transport the bottles throughout all of the machines forming the particular production line, thereby eliminating the need to transfer the bottles from one set of carriers to another. This results in the elimination of multiduplication of expensive equipment such as infeed timing screws, power drives, etc. Also, each bottle is securely held in its carrier so it can be rotated about the axis of the conveyor chain automatically, thereby to orient the bottle in proper position in the various operating stations. These features permit operation of the production line at a substantially higher speed than is possible with apparatus heretofore available. Additionally, the bottle-receiving adapters can be replaced quickly and conveniently to change over the line for operation with bottles or other containers of different nominal size and shape.

The construction of the individual carriers and their pivotal attachment to the conveyor chain in accordance with one embodiment of the invention, will now be described with particular reference to FIGURES 2 and 3, FIGURE 2 being a top plan view with portions broken away and FIGURE 3 being a corresponding side elevational view. A U-shaped bracket 16 has two holes formed in the base portion, which holes are spaced to receive the elongated pins 17 passing through adjacent rollers 11. An L-shaped bracket 18, positioned on the opposite side of the chain, also is provided with similar holes. These two brackets are secured in place by peaning over the ends of the pines 17. As seen in FIGURE 3, the upper surface of the bracket 18 and the upper sides of the arms of the bracket 16 lie in a plane containing the upper side edges of the links 19 forming the sides of the chain. A rod 20, carrying the spacer bushings 21, passes through aligned holes formed in the arms of the bracket 16 and has its ends peaned over. The rod 20 also passes through a clearance hole formed in the enlarged-diameter end 22 forming an integral part of a vertically-extending arm 23. The parts are so dimensioned that the arm 23 is freely rotatable about the rod 20.

A generally-square base plate 25 is welded to the arm 23 and has a central hole 26 extending therethrough. A circular shell 27 is supported by the plate 25 and is secured thereto, as by welding. Preferably, the outer wall of the shell engages the upright arm 23 and is also welded thereto to provide a sturdy structure. Formed in diametrically-opposed wall portions of the shell are two slots 28 to form a bayonet-type socket. It will be apparent, now, that the plate 25, shell 27 and arm 23 comprise a unitary structure mounted for free pivotal movement about the rod 20. These components constitute a bottle carrier.

When the bottle carrier is in the normal position, as shown, the base plate 25 rests upon the L-shaped bracket 18. In this position, the shell 27 is oriented to receive a bottle in the normal, upright position, see also the carriers identified by the numerals 12 at the inserted station A of FIGURE 1. When the contained bottle is to be oriented in the horizontal position, the carrier is rotated 90 degrees about the rod 20 as shown in the side elevational view of FIGURE 4, see also the carriers identified by the numeral 12b and positioned in the packing station F of FIGURE 1. FIGURE 5 shows the carrier rotated 180 degrees, thereby to invert the contained bottle, see also the carriers identified by the numerals 12a positioned in the washing station B of FIGURE 1.

Reference now is made to FIGURES 6 and 7 showing the construction of an adapter 29, FIGURE 6 being a top plan view and FIGURE 7 being a cross-sectional view taken along the line 7—7 of FIGURE 6. The adapter comprises an outer cylindrical member 30, an inner tubular member 31 having a flared end, a base washer 32 and a spacer washer 33 having holes 34 formed therein. These members, preferably made of a resilient material such as plastic or rubber, are cemented together to form a unitary structure. Alternatively, the adapter may comprise a unitary member molded to a desired shape. A pair of diametrically-opposed pins 35 extended from the outer cylindrical member 20, said pins being either molded directly into such member or riveted thereto.

As shown in FIGURE 8, the adapter 29 fits into the shell 27, of the carrier, and is secured thereto by the means of the coupling pins 35 extending through the bayonet slots of the shell. The design is such that a certain amount of force is required to position the coupling pins within the offset portions of the slots, the resulting compressive force applied to the adapter serving to retain the adapter securely in position within the shell. Other mechanical coupling arrangements may be provided for removably securing the adapter to the carrier as, for example, spring clips, detents, etc. It will be noted that in this particular adapter, the inner tubular member has a diameter and length appropriate for snugly receiving a relatively small bottle 37, with the bottom spanning the central opening 26 formed in the carrier base plate 25. Thus, the bottle is securely retained on the carrier, yet can be ejected from the carrier by means of a plunger passing through the hole 26 when the carrier is rotated 90 degrees. This feature affords mounting of solenoid-actuated or cam-actuated plungers at convenient locations along the conveyor chain, thereby to reject bottles which do not meet specific tests after passing through the various operating stations.

Modified constructions of the adapters are shown in FIGURES 9 and 10. In FIGURE 9, the bottle 38 is tall but of relatively small diameter. In this case, the adapter 29a comprises the outer cylindrical member 30, modified washers 32a and 33a and a modified inner tubular member 31a, all for the purpose of retaining a bottle of this particular configuration securely in place on the carrier. FIGURE 10 shows a tall bottle 39 having a maximum diameter for accommodation by carriers having a given-diameter shell. In this case, the adapter comprises only the flared tubular member 31b provided with the two diametrically-opposed pins 35 for bayonet-type coupling thereof to the shell 27. It will be apparent that each set of adapters is designed for use with bottles of a given nominal size and that all of the adapters are provided with means for removably securing them to the shells of the carriers. Also, the described inner members of the adapters, which receive the bottles, may have other cross-sectional configurations for use with bottles of a shape other than circular. Slots may be formed in the wall of the carrier and/or adapter to permit rotating or holding the bottle, when desired, while the bottle is being laterally transported. By way of example, and as shown in FIGURE 10, opposed slots 40 and 41 are formed in the wall of the adapter 31b. A set of belts 42, 43, one on each side of the bottle and in intimate contact therewith, can act either as a means for maintaining bottle stability when traveling at high speeds, or as a bottle-rotating means, by adjusting the speed of travel of the belts relative to that of the conveyor chain or to each other, respectively. Either of these actions can be utilized to produce relative motion between the bottle and its fitments such as, for example, a cap.

Reference now is made to FIGURE 11 showing a modified construction of the carrier and the adapter. Here, two L-shaped brackets 18, 18' are disposed on opposite sides of the chain and are secured to the chain by peaning over the ends of an extended chain pin 17. A solid, flat plate 45 spans the brackets and is secured thereto by the screws 44. A metal cylinder 46 has a pivot arm 47 welded thereto, which arm is pivotable about the shaft carried by the clevis 48, said clevis being secured to the plate 45, as by screws. The adapter 49, molded to shape for receiving odd-shaped containers such as the pliable tube 50, is removably secured to the cylinder by means which have already been described. The cylinder, adapter and tube may be rotated as a unit about the clevis shaft 51 by means of a suitable cam mechanism acting upon the cam pin 52 extending from the cylinder 46.

In a straight line conveyor chain, as shown in FIGURE 1, the machines for performing the various operations are positioned in-line along the conveyor chain and the bottles are transported through a given machine in a straight line. Often, one or more of the machines are of the rotary type, thereby normally necessitating a transfer of the bottles from the main conveyor to the machine conveyor for transport of the bottles through the machine in a circular path. Thereafter, the bottles are again transferred to the main conveyor for transport to the next machine. Also, irrespective of the mode of operation of the particular machines, it often is desirable to arrange the production line in a form other than a long straight line, thereby to provide a more efficient layout from the standpoint of space requirements and overall operations. Such production lines require a conveyor chain capable of following a circular path in the horizontal plane as shown, for example, in FIGURE 12 wherein a single conveyor chain 55 passes through a circular filling station 56 and a circular capping station 57.

The construction of the pivotable carriers and the means for attachment thereof to a conveyor chain of the type which can follow a circular path in the horizontal plane, is shown in FIGURES 13 and 14. The chain comprises metal links 60 and resilient links 61 pivotally-coupled together by pins. The vertical pins 62 are of extended length and provided with circular grooves for receiving snap rings. A carrier mounting plate 63, provided with holes 64, is positioned on the upper horizontal, metal link 60 and secured in place by means of the snap rings 65. The holes 64 terminate in enlarged-diameter bores for accommodating the snap rings and the extended portions of the chain links 62 have a length somewhat less than the thickness of the mounting plate. Threaded holes 66 are provided in the mounting plate for receiving the screws 67 by means of which the clevis 68 is secured to the plate. A hollow, cylindrical member 69 has secured thereto, as by welding, a pivot lug 70 having a hole extending therethrough. Such lug is pivotally coupled to the clevis by the clevis shaft 71 carrying the snap rings 72. A tubular adapter 73, of a desired length and internal diameter, is removably secured to the cylindrical member 69, as by means of the diametrically-opposed pins 74 and the bayonet-type slots formed in the cylindrical member. The mounting plate 63 remains secured to the chain while the carrier 69 and the adapter 73 are subject to rotation about the clevis shaft 71 as by a cam mechanism acting upon the cam pin 75 secured to and extending from the carrier. Since the carrier and the adapter are open at each end, rotation of the carrier 90 degrees exposes the bottom of a contained bottle for ejection purposes. It will be understood that each of the horizontally-disposed metal links of the chain have carrier mounting plates secured thereto. Such mounting plates, and the carriers pivotally-secured thereto, do not interfere with the supporting sprockets by means of which the chain is caused to follow a circuitous path in the horizontal plane. The illustrated carriers are readily replaceable by carriers of other sizes and shapes.

The integration of the carrier-conveyor with other equipment and apparatus of the production line, eliminates the need for timing or infeed controls. It is not essential that the carriers and/or adapters frictionally engage the bottle, or other container. The use of the individual carriers maintains stability of the containers when traveling at high speeds along a circuitous path. These carriers also permit maintaining the relative positions of the containers and stations along the production line to a satisfactory degree of accuracy so that simple means, when required, can be used at each station for maintaining a more precise spacing and orientation of the containers.

Having now described the invention, those skilled in this art will be able to make various changes and modifications without thereby departing from the spirit and scope of the invention as recited in the following claims.

I claim:
1. Apparatus for transporting objects comprising,
 (a) a conveyor chain,
 (b) a plurality of carriers pivotally secured to the chain for individual rotation about an axis substantially parallel to that of the chain, said adapters comprising tubular members having bayonet-type slots formed in the walls thereof, and
 (c) object-receiving adapters removably secured to the said carriers, said carriers having secured thereto pins cooperating with the said slots thereby to secure an adapter to the associated carrier.

2. A carrier for use in transporting an object by a conveyor chain comprising,
 (a) a bracket member,
 (b) means carried by the bracket member and forming a pivot axis,
 (c) a tubular member having bayonet-type slots formed in the wall thereof,
 (d) means coupling the tubular member to the bracket member for rotation about the said pivot axis,
 (e) an adapter insertable into the tubular member and having outwardly-directed pins passing through the said slots, said adapter having a configuration for receiving an object to be transported, and
 (f) means for securing the carrier to the chain.

3. Transport apparatus comprising,
 (a) a conveyor chain,
 (b) a plurality of mounting plates secured to the chain,
 (c) a plurality of bracket members, each member secured in fixed position to an associate one of said mounting plates,
 (d) means carried by each bracket member and forming a pivot axis spaced from and parallel to one side of the chain,
 (e) a plurality of tubular members, each having bayonet-type slots formed in the wall thereof,
 (f) means mechanically-coupling each tubular member to an associated bracket member for rotation about the corresponding pivot axis, and (g) a plurality of adapters for receiving objects to be transported, each adapter being positionable within an associated one of the said tubular members and having outwardly-directed pins passing through the slots of the tubular member.

4. Transport apparatus comprising,
(a) a conveyor chain,
(b) a plurality of horizontally-disposed, flat plates secured to the chain,
(c) a pivot pin carried by each of the said plates, said pin being spaced to one side of the chain and parallel to the chain axis,
(d) a plurality of open-ended tubular members, each tubular member being normally disposed in a vertical position above the chain with an end thereof resting upon an associated one of the said plates,
(e) an adapter removably disposed within each tubular member for receiving an object to be transported, and
(f) means pivotally connecting each tubular member to the associated pivot pin, the tubular member being rotatable through-out an angle of 180 degrees to an inverted vertical position spaced to the said one side of the chain.

References Cited

UNITED STATES PATENTS

| | | | |
|---|---|---|---|
| 852,345 | 4/1907 | Paul | 198—131 |
| 1,642,824 | 9/1927 | Paulson | 198—131 |
| 2,599,721 | 6/1952 | Remington | 198—131 X |
| 3,199,552 | 8/1965 | Nordfors | 198—131 X |

EVON C. BLUNK, *Primary Examiner.*

EDWARD A. SROKA, *Examiner.*